(No Model.) 2 Sheets—Sheet 1.
P. F. CARROLL.
CAKE DROPPING MACHINE.
No. 390,202. Patented Oct. 2, 1888.
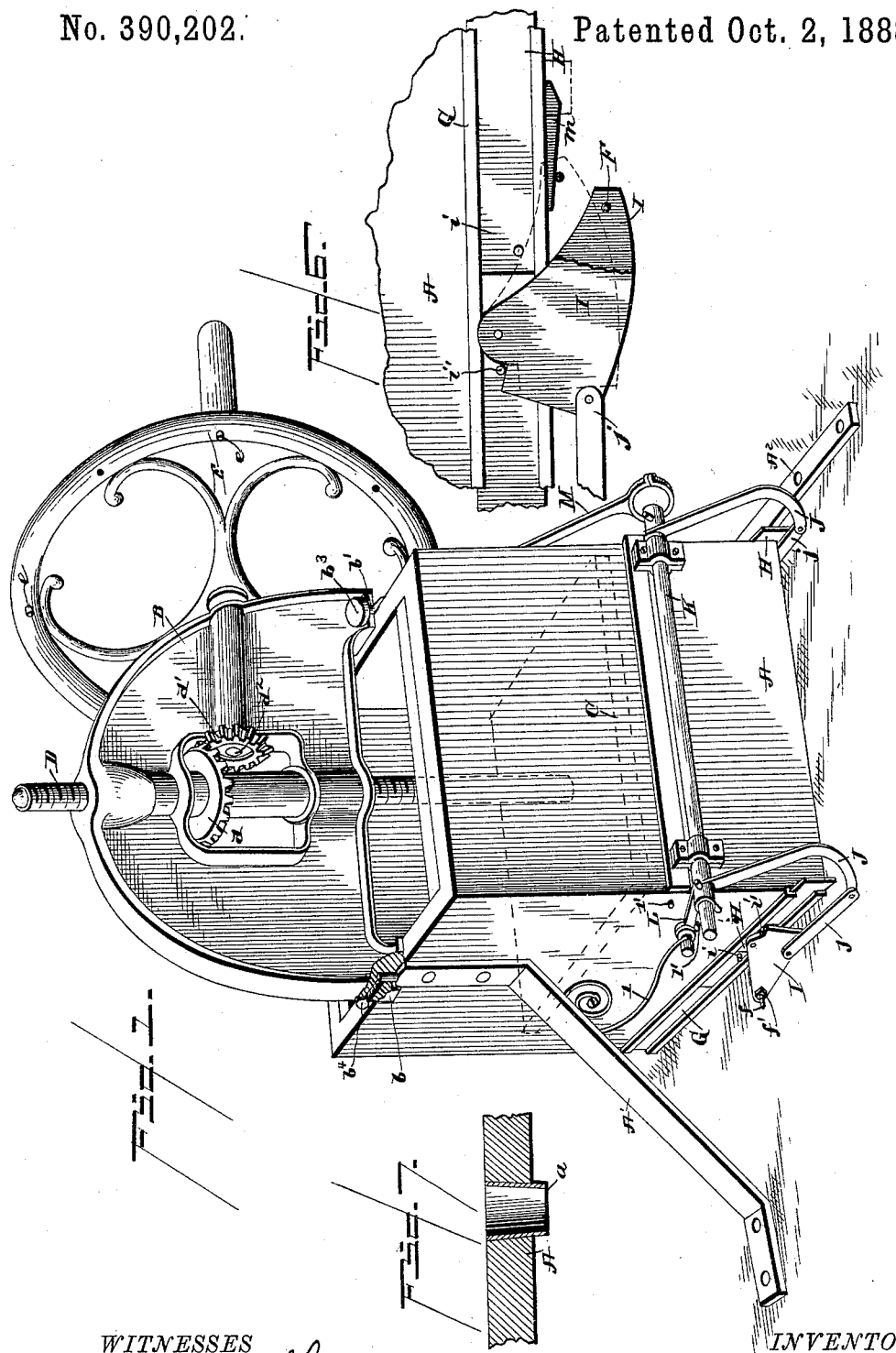
WITNESSES
M. H. Pumphrey.
Van Buren Hillyard.
INVENTOR
Philip F. Carroll
By R. S. & A. P. Lacey
Attorneys

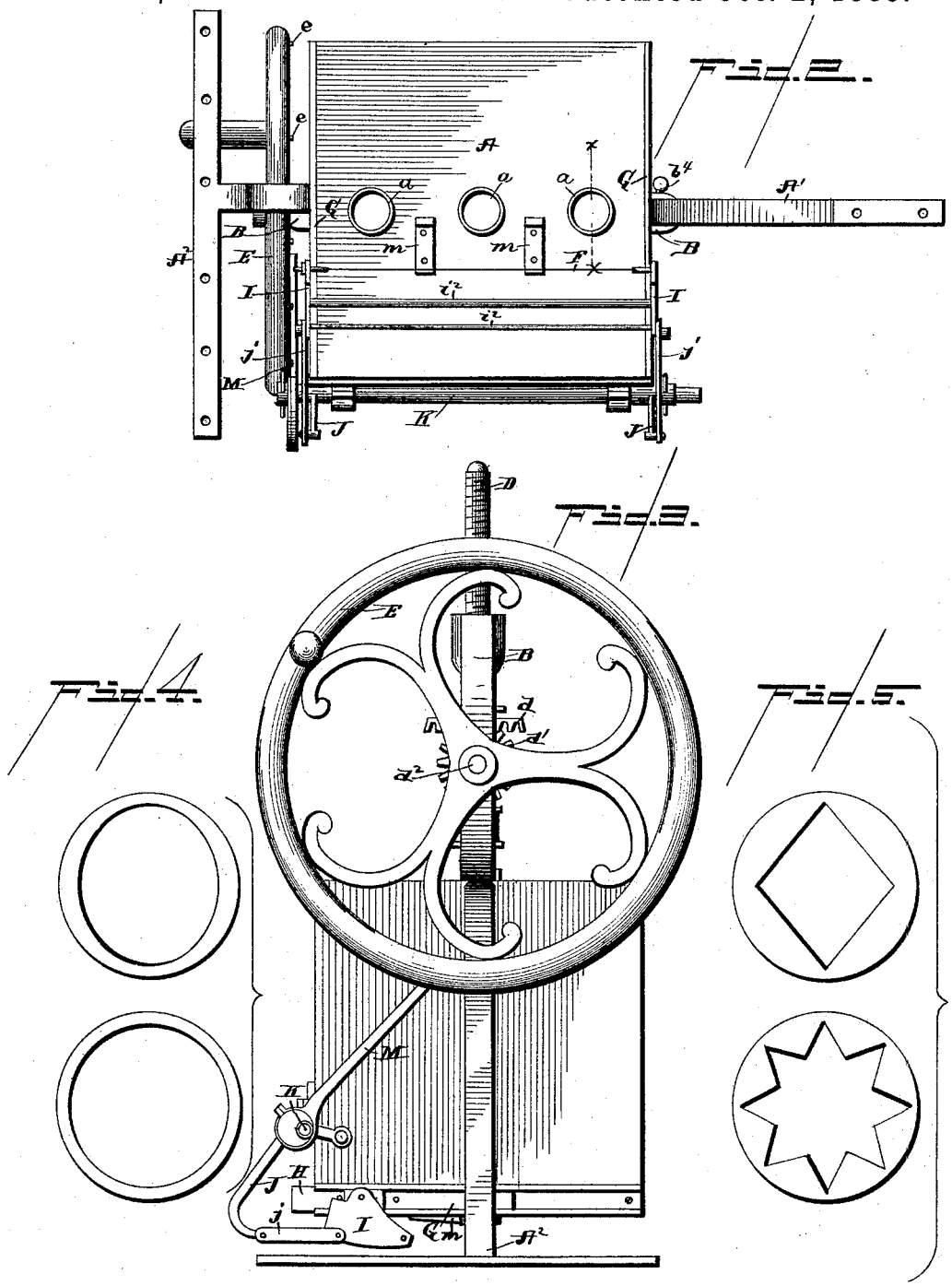

UNITED STATES PATENT OFFICE.

PHILIP FRANCIS CARROLL, OF MANCHESTER, IOWA.

CAKE-DROPPING MACHINE.

SPECIFICATION forming part of Letters Patent No. 390,202, dated October 2, 1888.

Application filed May 31, 1888. Serial No. 275,582. (No model.)

*To all whom it may concern:*

Be it known that I, PHILIP FRANCIS CARROLL, a citizen of the United States, residing at Manchester, in the county of Delaware and State of Iowa, have invented certain new and useful Improvements in Cake-Dropping Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to machines for dropping cakes, and has for its object to improve the general construction of this class of machines and render compact the operating parts, which are supported on the hopper.

The improvements consist of the novel features and peculiar construction and combination of the parts, which hereinafter will be more fully described and claimed, and shown in the drawings, in which—

Figure 1 is a perspective view, parts being broken away, of a cake dropping and cutting machine embodying my invention; Fig. 2, a bottom plan view of the machine; Fig. 3, a side view of the machine. Figs. 4 and 5 are detail plan views of a series of interchangeable nozzles; Fig. 6, a detail side view on an enlarged scale, showing the operation of the vibrating plates by dotted lines; and Fig. 7, a section detail view on the line X X of Fig. 2.

The hopper A, for holding the batter or dough, is supported on the standards A' and A$^2$, and is provided with a series of nozzles, $a$, in its bottom, through which the dough is forced.

The head B, carrying the mechanism for operating the follower C, rests on the hopper, and is provided with the opening $b$ at one end and the slot $b'$ at the other end. The standards A' and A$^2$ are extended above the hopper, the extended end of the standard A' entering the opening $b$ and the extended end of the standard A$^2$ fitting in the slot $b'$ and having a head, $b^3$, which overlaps the sides of the slot and holds the head B to the hopper at one end, the other end of the head B being held to the hopper by the set-screw $b^4$, which passes through the end of said head and bears against the extended end of the standard A'. The screw D, having the follower C at its lower end, is vertically journaled in the head B, and is provided with the bevel-pinion $d$, which is internally threaded, and which meshes with a corresponding bevel-pinion, $d'$, on the shaft $d^2$, journaled in the frame at right angles to the screw. The hand-wheel E, keyed to the outer end of the shaft $d^2$, is rotated by hand or other means, and, through the gearing $d$ and $d'$, feeds the screw D down, and the follower attached to the lower end of the screw forces the dough from the hopper out through the nozzles $a$, when it is cut off by the cutter F.

The guides G at each side of the hopper, near its lower end, are provided with the slides H, which have the vibrating plates I pivotally connected therewith and limited in their movements by the stops $i$ and $i'$. These plates I are connected together by the cross-bars $i^2$, which hold them at a fixed distance apart and prevent them from coming together when the cutter F is under tension.

The cutter F, secured at its ends to the front ends of the plates I, is preferably a thin wire having one end fastened to the threaded tension-bar $f$, which passes through an opening in the plate I, and is provided with the nut $f'$ on its outer end, which is screwed on the said rod to obtain a tension on the said wire cutter F. The plates are connected with the arms J, extending from the rock-shaft K, by the links $j$. The arm L, projecting from the shaft K, is operated on by the spring $l$, which holds the parts in a normal position, being limited in its movement by the stop $l'$. The trip-arm M, extending from the shaft K, projects within the path of the tappets $e$ on the drive-wheel E on the shaft $d^2$, and is operated by said tappets $e$ when the wheel E is set in motion.

The operation of the machine is as follows: The wheel E being rotated, the follower C, through the means hereinbefore described, forces the dough through the nozzles, and the tappet $e$, striking the arm M, rocks the shaft K in its bearings and moves the arms $j$ forward, carrying the cutter against the dough and cutting it. When the tappet slips off the arm M, the spring $l$, acting on the arm L, will return the parts to their normal position. As the arms $j$ advance, their first action will be to vibrate the plates I and carry the cutter up to about the plane of the ends of the nozzles, and when the arms move back after the operation of the cutter the plates are vibrated to carry the cutter away from the plane of the ends of the nozzle, so that the cutter may be carried back to its normal position without interfering with the dough which is coming from the nozzles to form the next cakes. To prevent the cutter being carried above the ends of the nozzles and from catching thereon when advancing to its work, the inclined guide-pieces $m$ are provided. These inclined guides are arranged between or at the ends of the row of nozzles and terminate in about the plane of the ends of the nozzles.

The tappets $e$ are interchangeable—i. e., they can be arranged closer together or at a greater distance apart, to operate the cutter a greater or less number of times during one complete revolution of the wheel carrying the tappets, whereby the amount of dough in the cakes can be varied.

The nozzle $a$ may be removable to facilitate the cleaning them or to replace them by a set of nozzles of a different size or shape, according to the nature of the cake to be produced.

I do not wish to restrict myself to the means shown for operating the rock-shaft K, as the arm M can be operated from either roller over which the endless carrier usually employed in this class of machines for supporting the pan passes.

The arm M may be composed of two parts, which are hinged together and held distended by a spring, so that the wheel E can be turned back without operating the cutter, the outer part of the arm yielding to allow the tappets to pass the arm.

Having thus described my invention, what I claim, and desire to secure by Letters Patent, is—

1. In a cake-machine, the combination, with the hopper and the follower, of the extensions at each side of the hopper, the head B, having an opening to receive one of the said extensions and a slot to receive the other extension, which has a head to overlap the sides of the slot, the set-screw for holding the head to the extensions, and the mechanism, substantially as described, for operating the follower carried by the said head, substantially as specified.

2. In a cake dropping and cutting machine, the combination of the hopper having openings for the escape of the dough and having guides at each side, the slides adapted to travel in the said guides, the plates I, pivotally connected with the said slides, the cutter supported at its ends by the plates I, and the rock-shaft having connection with the said plates for turning the plates on their pivotal supports and moving the slides, substantially as and for the purpose described.

3. In a cake-dropping machine, the combination, with the hopper having dough-openings and having guides at each side, the slides held to and working in the guides, and the plates pivotally connected with the slides and having the cutter supported between them, of the driving mechanism, as the rock-shaft, connected with the said plates to turn them on their pivotal connections with and actuate the said slides, and the stops $i$ and $i'$, provided on the slides and arranged one on each side of the pivotal support of the said plates, substantially as and for the purpose described.

4. In a cake-cutting machine, the combination, with the cutter and the tappet-arm connected with the cutter, of the wheel and interchangeable and removable tappets, whereby the number of tappets and the distance between the tappets can be varied, substantially as and for the purpose described.

5. In a cake dropping and cutting machine, the combination, with the hopper having discharge-openings and the cutter, of the nozzles projecting beyond the hopper, and the separate inclined guide-pieces located between the nozzles, substantially as and for the purpose described.

In testimony whereof I affix my signature in presence of two witnesses.

PHILIP FRANCIS CARROLL.

Witnesses:
A. W. LYNCH,
MERT. K. BROWN.